(12) United States Patent
Wang et al.

(10) Patent No.: US 9,284,951 B2
(45) Date of Patent: Mar. 15, 2016

(54) SOLAR-ENERGY HEAT POWER-GENERATING SYSTEM AND THERMOELECTRIC CONVERSION DEVICE THEREOF

(75) Inventors: Shuhui Wang, Xiangtan (CN); Minhui Wang, Xiangtan (CN); Yuelei Zhang, Xiangtan (CN); Mi Mou, Xiangtan (CN); Yueying Li, Xiangtan (CN); Yingzhao Ma, Xiangtan (CN)

(73) Assignee: Xiangtan Electric Manufacturing Co., Ltd. (CN)

( * ) Notice: Subject to any disclaimer, the term of this patent is extended or adjusted under 35 U.S.C. 154(b) by 177 days.

(21) Appl. No.: 13/981,358

(22) PCT Filed: Apr. 26, 2012

(86) PCT No.: PCT/CN2012/074750
§ 371 (c)(1),
(2), (4) Date: Jul. 24, 2013

(87) PCT Pub. No.: WO2013/007123
PCT Pub. Date: Jan. 17, 2013

(65) Prior Publication Data
US 2013/0298555 A1 Nov. 14, 2013

(30) Foreign Application Priority Data

Jul. 14, 2011 (CN) .......................... 2011 1 0197353

(51) Int. Cl.
*B60K 16/00* (2006.01)
*F03G 6/00* (2006.01)
(Continued)

(52) U.S. Cl.
CPC *F03G 6/00* (2013.01); *F01D 15/10* (2013.01); *F01D 25/18* (2013.01); *F03G 6/064* (2013.01); *F01D 17/165* (2013.01); *F02C 1/05* (2013.01); *F05D 2260/85* (2013.01); *Y02E 10/46* (2013.01)

(58) Field of Classification Search
CPC ........... F03G 6/00; F03G 6/064; F01D 15/10; F01D 25/18; F01D 25/166; F01D 25/168; F01D 25/186; F01D 25/20; F01D 25/16; F01D 25/162; F01D 25/024; F01D 25/04; F01D 29/05; F01D 29/051; F01D 29/0513; F01D 29/056; F01D 29/057; F01D 17/165; Y02E 10/46
USPC ......... 60/641.8, 643; 416/111–112, 229–231, 416/104–105, 107; 415/175–176; 417/407, 417/374, 365; 384/123, 368, 420
See application file for complete search history.

(56) References Cited

U.S. PATENT DOCUMENTS 4,659,295 A * 4/1987 Burdette ............... F01D 17/165
415/164
5,704,209 A * 1/1998 Bronicki ............... F01K 23/067
60/650

(Continued)

FOREIGN PATENT DOCUMENTS

| CN | 1113290 A | 12/1995 |
| CN | 1156787 A | 8/1997 |

(Continued)

OTHER PUBLICATIONS

CN101592079A Translation, Jiang Qin et al., Solar distributed closed gas turbine power generation system, Dec. 2009, China.*

(Continued)

*Primary Examiner* — Jesse Bogue
*Assistant Examiner* — Kelsey Stanek
(74) *Attorney, Agent, or Firm* — Lerner, David, Littenberg, Krumholz & Mentlik, LLP

(57) ABSTRACT

A solar-energy heat power-generating system and thermoelectric conversion device thereof, the thermoelectric conversion device comprising a power generator (5), an air compressor, a turbine and an intermediate body (12) fixedly connected between the air compressor and the turbine; the interior of the intermediate body (12) is rotatably connected to a transmission shaft (28); the transmission shaft (28) is fixedly connected to the rotating shaft of the power generator (5); the air compressor impeller (7) of the air compressor and the turbine impeller (18) of the turbine are both installed on the transmission shaft (28); the power generator (5) is also connected to a conducting wire (3) for inputting current; the solar-energy heat power-generating system comprises a heat collector and the thermoelectric conversion device; the air compressor of the thermoelectric conversion device is located upstream of the heat collector, and the turbine is located downstream of the heat collector.

18 Claims, 6 Drawing Sheets

(51) Int. Cl.
  *F01D 15/10* (2006.01)
  *F03G 6/06* (2006.01)
  *F01D 25/18* (2006.01)
  *F02C 1/05* (2006.01)
  *F01D 17/16* (2006.01)

(56) References Cited

U.S. PATENT DOCUMENTS

| | | | |
|---|---|---|---|
| 2003/0223892 | A1 | 12/2003 | Woollenweber |
| 2004/0096317 | A1* | 5/2004 | Scholz ................ F01D 17/165 415/160 |
| 2004/0200215 | A1* | 10/2004 | Woollenweber et al. ....... 60/407 |
| 2007/0204615 | A1* | 9/2007 | Vrbas ............................ 60/602 |
| 2008/0087018 | A1* | 4/2008 | Woollenweber ........ F01D 25/16 60/605.3 |

FOREIGN PATENT DOCUMENTS

| | | | |
|---|---|---|---|
| CN | 2340962 | Y | 9/1999 |
| CN | 101566101 | A * | 10/2009 |
| CN | 101592079 | A * | 12/2009 |
| CN | 101761389 | A | 6/2010 |
| CN | 201581979 | U | 9/2010 |
| DE | 1503527 | A1 | 8/1969 |
| EP | 1063763 | B1 | 9/2003 |
| EP | 1418311 | A1 | 5/2004 |
| EP | 1930587 | A2 | 6/2008 |
| EP | 2123882 | A1 | 11/2009 |
| FR | 2904669 | A1 | 2/2008 |

OTHER PUBLICATIONS

CN101566101A Translation, Yiwu Weng et al., Power generation method of rotary-catalytic regenerative-type low-calorific-value gas turbine, Oct. 2009, China.*
International Search Report for Application No. PCT/CN2012/074750 dated Aug. 2, 2012.
Extended European Search Report for Application No. 12811363.6 dated Feb. 9, 2015.

* cited by examiner

SOLAR-ENERGY HEAT POWER-GENERATING SYSTEM AND THERMOELECTRIC CONVERSION DEVICE THEREOF

The present application is a national phase entry under 35 U.S.C. §371 of International Application No. PCT/CN2012/074750 filed Apr. 26, 2012, published in Chinese, which claims priority from Chinese Patent Application No. 201110197353.1 filed Jul. 14, 2011, all of which are incorporated herein by reference.

FIELD OF THE INVENTION

The present application relates to the technical field of solar thermal power generation, and particularly to a thermoelectric conversion device for a solar thermal power generation system. In addition, the present application further relates to a solar thermal power generation system including the above thermoelectric conversion device.

BACKGROUND OF THE INVENTION

Solar energy is one of the new energies that are most promising and most likely to meet continually increased demand for energy in future social development, and has characteristics such as unlimited reserves, wide distribution, clean utilization and the economical efficiency. The solar thermal power generation has some characteristics, for example, better adaptability to power grid load, high photoelectric conversion efficiency, scale effect with ease, environment-friendly manufacturing process of consumptive material, better adjustability of the electric power, and so on. Thus, the solar thermal power generation is an important development direction of utilization of solar power generation in the future.

The basic technical idea of the solar thermal power generation is that: the sunlight is converged through a heat collector to increase the energy density of light energy; the collected light energy is absorbed by a heat absorbing device and converted into heat energy; the heat energy is transferred to working medium to increase the internal energy of the working medium; and then the internal energy in the working medium is converted into mechanical energy through a heat engine and a generator is driven so that the mechanical energy is further converted into electric energy to be output. In the whole process of energy conversion, converting the heat energy into the mechanical energy is the most critical aspect.

Currently, there are mainly three kinds of the heat engine that are applicable to the solar thermal power generation system, i.e., the steam turbine based on Rankine cycle, the Stirling engine based on Stirling cycle and the small-scale gas turbine based on Brayton cycle. Specifically, the steam turbine can use hydrocarbons (halogenated hydrocarbons) or water having low boiling point and good heat stability as the working medium. However, because the temperature that the working medium can withstand is low, the heat efficiency is low. The steam turbine is generally used in a slot-type power generation system with low the heat collection temperature. The Stirling engine uses hydrogen or helium working medium which has the dynamic seal pressure up to 15 Mp or more when working, so that the working reliability, stability and lifetime are limited to some extent. The small-scale gas turbine can directly use air as the working medium. That is, air is compressed by a compressor, then absorbs heat and is heated up in a working medium heating device, and then goes into a turbine for expanding and doing work; and the mechanical work in turn drives the compressor and the generator for outputting current. The small-scale gas turbine is simple in the design, has no demanding seal conditions, directly obtains and discharges the working medium from and into atmosphere, and has better reliability and stability.

However, for using the small-scale gas turbine as the heat engine for solar thermal power generation equipment, there are following several problems to overcome in addition to difficulty in designing impellers of the compressor and the turbine with high efficiency as well as high speed generator:

1) start-up performance of the system: because the turbine and the compressor are coupled to each other, after the compressor drives the high-pressure airflow into the heat collector, the heat generated by the heat collector can be absorbed by the airflow, and the formed high-temperature and high-pressure airflow can pass through the turbine to output mechanical work and to drive the compressor and the generator. Thus, when the system is actuated, an additional starting device is required to give an initial rotating speed to the compressor. In this way, the whole system can be actuated smoothly, resulting in a more complex structure of the thermoelectric conversion device.

2) lifetime and reliability of the high speed generator: because the operating rotating speed of the small-scale gas turbine is up to 100000 to 200000 r/min, cooling requirement of the generator is extremely demanding. It is necessary to provide a good solution to cooling, otherwise the lifetime and reliability of the generator will be affected.

3) operation stability and robustness of the system: when the high-temperature air going into the turbine air inlet deviates from the designed working temperature and pressure of the turbine due to fluctuation in solar radiation and so on, the rotating speed of the turbine impeller will significantly fluctuate, resulting in a fluctuation in the rotating speed of the turbine impeller, and the flow and pressure of the air going into the working medium heating device will fluctuate as well, thus further leading to fluctuation in the rotating speed of the turbine impeller, and causing loss of stability of the system.

SUMMARY OF THE INVENTION

A technical problem to be solved according to the present application is to provide a thermoelectric conversion device for a solar thermal power generation system, which has a better startability since there is no need for additionally providing a start-up device to rotate a compressor when the thermoelectric conversion device is started, and has a better stability since the generator can be better cooled in the process of thermoelectric conversion. Another technical problem to be solved according to the present application is to provide a solar thermal power generation system including the thermoelectric conversion device.

In order to solve the above technical problems, there is provided according to the present application a thermoelectric conversion device for a solar thermal power generation system including a generator, a compressor, a turbine and an intermediate body fixedly connected between the compressor and the turbine. A transmission shaft is rotatably connected inside the intermediate body. The transmission shaft is fixedly connected to a rotating shaft of the generator, and a compressor impeller of the compressor and a turbine impeller of the turbine both are mounted on the transmission shaft. The generator is further connected to a lead for inputting current. When the system is started, the generator functions as an electric motor; and when the system is in normal operation, the generator functions to produce electricity.

Preferably, the generator is arranged in an air inlet flowing passage inside the compressor.

Preferably, a heat insulation plate is provided between a rear flange of the intermediate body and a turbine volute of the turbine, and an annular nozzle is formed between the heat insulation plate and a vertical rear side wall of the turbine volute.

Preferably, at least one airflow guide vane for adjusting the injection-expansion ratio of airflow within the nozzle is provided in the nozzle.

Preferably, the heat insulation plate is provided therein with a through hole oriented in the fore-and-aft direction. An outer end of the airflow guide vane is pivotally connected in the through hole, and an inner end of the airflow guide vane swings as the outer end rotates in the through hole.

Preferably, a rear side wall of the intermediate body is provided with an arc-shaped hole, and a shift lever slidable along the arc of the arc-shaped hole is inserted into the arc-shaped hole. The shift lever extends through a rear end of the intermediate body to be connected to a slide ball that rotates in an end surface along with the shift lever. A shift fork is provided in front of the heat insulation plate. The outer end of the airflow guide vane is fixedly connected between two fork-shaped portions of the shift fork, and a straight-bar portion of the shift fork is slidably inserted into a through hole in the slide ball.

Preferably, a diffusing pipe of the compressor is an annular space formed between an end surface of a positioning boss on the front flange of the intermediate body and a corresponding portion of a compressor volute.

Preferably, the intermediate body is rotatably connected to the transmission shaft through a floating bearing, and a thrust bearing is provided in front of the floating bearing. An oil inlet hole is provided at the top end of the intermediate body. Lubrication passages leading to two of the floating bearing and the thrust bearing are provided at the bottom end of the oil inlet hole. An oil outlet hole is further provided at the bottom end of the intermediate body. An oil baffle plate is further provided at a lower end of a transition ring located in front of the thrust bearing, and the oil baffle plate is arranged to be inclined towards the oil outlet hole.

Preferably, a sealing element is provided at contacting area between a front end of the transition ring and a bearing cover of the thrust bearing, and an oil throwing plate that projects towards the outside of the transmission shaft is further provided on the transition ring between the sealing element and the oil baffle plate.

Preferably, a projecting ring is provided at the rear side of the rear floating bearing of the transmission shaft, the sealing element is provided at a contacting area between a rear end of the projecting ring and a side wall of the intermediate body.

In the thermoelectric conversion device for a solar thermal power generation system according to the present application, a transmission shaft is rotatably connected inside the intermediate body; the transmission shaft is fixedly connected to a rotating shaft of the generator, and a compressor impeller of the compressor and a turbine impeller of the turbine both are mounted on the transmission shaft; the generator is further connected to a lead for inputting current; when the system is started, the generator functions as an electric motor; and when the system is in normal operation, the generator functions to produce electricity.

By employing the thermoelectric conversion device with this structural form, when the system is started, external current is input to the generator through the lead so as to drive the rotating shaft of the generator to rotate. At this time, the generator is used as an electric motor, and drives the compressor impeller to rotate. Under the action of the compressor impeller, air coming from the atmospheric environment enters through a compressor entrance and flows through an air flowing passage into compressor impeller. The air obtains energy in a vane flowing passage of the compressor impeller to increase the flowing speed, temperature and pressure thereof. Then the air goes into a diffusing pipe and reduces flowing speed in the diffusing pipe, but further increase the temperature and pressure thereof, thus forming high-pressure air which is output through a compressor volute and a compressor air outlet. The high-pressure air described above goes into a heat exchanger through a pipe with a heat insulation layer, and then flows into a working medium heating device where the air is heated at constant pressure so as to form high-temperature air. The high-temperature air goes into turbine volute through a turbine air inlet and then flows through a nozzle. In the nozzle, the high-temperature air expands so as to achieve pressure reduction, temperature reduction and speed increase, and thus part of pressure energy is converted into kinetic energy. A high-speed airflow flowing out from the nozzle impacts a turbine impeller, and further expands and does work in a flowing passage of the turbine impeller, so as to achieve pressure reduction, temperature reduction and speed increase and push the turbine impeller to rotate. Finally, the air is discharged through an exhaust pipe of the turbine, thus forming the air after doing work. The air after doing work goes into a heat exchanger through a pipe with a heat insulation layer. The remaining heat in the heat exchanger is transferred to the air coming from the compressor, so as to recover part of the energy therein. Thus, the whole cyclic process is completed.

As the generator functioning as an electric motor causes increase of the rotating speed of the compressor impeller, the power output from the turbine is increasingly large, and the driving power required to be output by the generator is increasingly small, until the power output from the turbine exceeds the power required for the compressor. At this time, the function of the generator is changed from an electric motor to a generator and starts to output electric energy.

As can be seen from the above working process, in the thermoelectric conversion device with the above structure, in addition to outputting electric energy, the generator functions as an electric motor so as to drive the compressor to rotate at an initial stage of system startup, thereby converting the normal-temperature air into the high-temperature and high-pressure airflow. As compared with the prior art, since there is no need for additionally providing start-up equipment to rotate the compressor, the thermoelectric conversion device according to the application has good startability, so that the thermoelectric conversion device can have simple and compact structure, relatively reduced contour dimension and smaller occupying space.

The present application also provides a solar thermal power generation system, which includes a heat collector and the above thermoelectric conversion device. The thermoelectric conversion device is provided at an output end of the heat collector.

Because the thermoelectric conversion device has the above technical effects, the solar thermal power generation system including the thermoelectric conversion device also has the corresponding technical effects, which will not be described in detailed herein.

BRIEF DESCRIPTION OF THE DRAWINGS

In FIGS. 1 to 10, the correspondences between the reference numerals and the component names are listed as follows:

| | | |
|---|---|---|
| 1-air filtering assembly | 2-motor supporter | 3-lead |
| 4-air inlet flowing passage | 5-generator | 6-air inlet pipe |
| 7-compressor impeller | 8-compressor volute | 9-compressor air outlet |
| 10-high-pressure air | 11-front flange | 12-intermediate body |
| 13-oil inlet hole | 14-lubricating oil | 15-shift lever |
| 16-nozzle | 17-turbine volute | 18-turbine impeller |
| 19-exhaust pipe | 20-air after doing work | 21-fastening bolt |
| 22-turbine air inlet | 23-high-temperature air | 24-rear flange |
| 25-oil outlet hole | 26-oil baffle plate | 27-diffusing pipe |
| 28-transmission shaft | 29-tightening nut | 30-bearing assembly |
| 31-air deflector | 32-normal-temperature air | 33-retaining ring |
| 34-seal assembly | 35-thrust bearing | 36-lubrication passage |
| 37-floating bearing | 38-thrust ring | 39-transition ring |
| 40-oil throwing plate | 41-bearing cover | 42-slide ball |
| 43-major clamp piece | 44-fastening assembly | 45-retaining ring |
| 46-heat insulation plate | 47-minor clamp piece | 48-shift fork |
| 49-airflow guide vane | 50-rotating shaft | 51-pin assembly |
| 52-retaining sleeve | 53-arc-shaped hole | 54-positioning and clamping ring |
| 55-bearing seat hole | 56-positioning boss | 57-heat exchanger |
| 58-working medium heating device | | |

DETAILED DESCRIPTION OF THE INVENTION

An object of the present application is to provide a thermoelectric conversion device for a solar thermal power generation system. The thermoelectric conversion device is actuated without additional start-up device for driving a compressor to rotate, thus having good startability, and has an advantage of better stability since the generator can be better cooled in the process of thermoelectric conversion. Another object of the present application is to provide a solar thermal power generation system including the thermoelectric conversion device.

In order that the person skilled in the art can better understand technical solutions of the present application, the present application will be further described in detail in conjunction with the accompanying drawings and the embodiments hereinafter.

Figure 1:
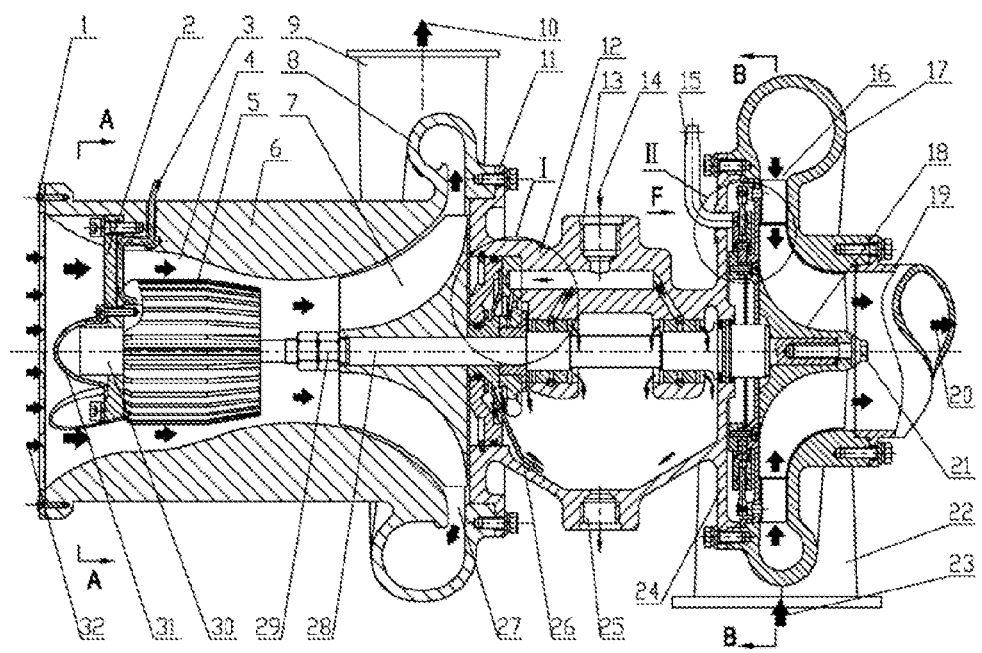
FIG. 1 is a partially structural sectional view of a specific embodiment of a thermoelectric conversion device according to the present application.
Figure 2:
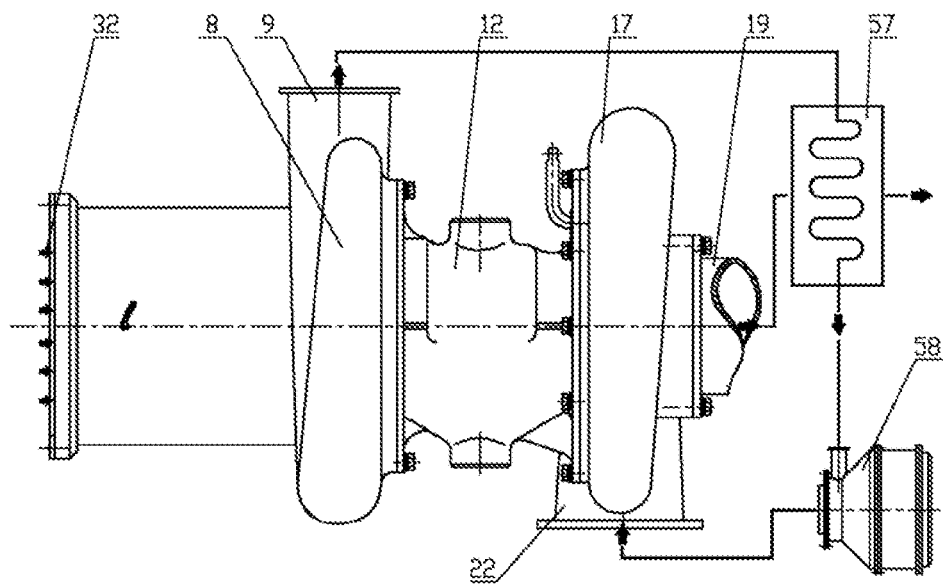
FIG. 2 is an overall outline view of a solar thermal power generation system including the thermoelectric conversion device of FIG. 1.

Referring to FIGS. 1 and 2, FIG. 1 is a partially structural sectional view of a specific embodiment of a thermoelectric conversion device according to the present application, and FIG. 2 is an overall outline view of a solar thermal power generation system including the thermoelectric conversion device of FIG. 1.

In one specific embodiment, as shown in FIGS. 1 and 2, the thermoelectric conversion device according to the present application mainly include a compressor, an intermediate body 12, a turbine, a heat exchanger 57, a working medium heating device 58 and a generator 5. The compressor is a component that does work to the normal-temperature air 32 by using vanes rotating at high speed so as to increase the pressure of the air. The turbine is an engine that generates power by using fluid impact to rotate an impeller. The intermediate body 12 is an intermediate component that connects the compressor and the turbine. Specifically, a front flange 11 and a rear flange 24 of the intermediate body 12 are fixedly connected to the compressor and the turbine respectively, and a transmission shaft 28 is rotatably connected inside the intermediate body 12. The transmission shaft 28 is fixedly connected with a rotating shaft of the generator 5, and a compressor impeller 7 and a turbine impeller 18 both are mounted on the transmission shaft 28. The generator 5 is further connected with a lead 3 for inputting current. When the system is started, the generator 5 functions as an electric motor; and when the system is in normal operation, the generator 5 functions as a generator.

By employing a thermoelectric conversion device in such a structural form, when the system is started, external current is input to the generator 5 through the lead 3 so as to drive the rotating shaft of the generator 5 to rotate. At this time, the generator 5 is used as an electric motor, and drives the compressor impeller 7 to rotate. Under the action of the compressor impeller 7, air coming from the atmospheric environment enters through a compressor entrance and flows through an air flowing passage into compressor impeller 7. The air obtains energy in a vane flowing passage of the compressor impeller 7 to increase the flowing speed, temperature and pressure thereof. Then the air goes into a diffusing pipe 27 and reduces flowing speed in the diffusing pipe 27, but further increase the temperature and pressure thereof, thus forming high-pressure air 10 which is output through a compressor volute 8 and a compressor air outlet 9. The high-pressure air 10 described above goes into a heat exchanger 57 through a pipe with a heat insulation layer, and then flows into a working medium heating device 58 where the air is heated at constant pressure so as to form high-temperature air 23. The high-temperature air 23 goes into turbine volute 17 through a turbine air inlet 22 and then flows through a nozzle 16. In the nozzle 16, the high-temperature air 23 expands so as to achieve pressure reduction, temperature reduction and speed increase, and thus part of pressure energy is converted into kinetic energy. A high-speed airflow flowing out from the nozzle 16 impacts a turbine impeller 18, and further expands and does work in a flowing passage of the turbine impeller 18, so as to achieve pressure reduction, temperature reduction and speed increase and push the turbine impeller 18 to rotate. Finally, the air is discharged through an exhaust pipe 19 of the turbine, thus forming the air after doing work 20. The air after doing work 20 goes into a heat exchanger 57 through a pipe with a heat insulation layer. The remaining heat in the heat exchanger 57 is transferred to the air coming from the compressor, so as to recover part of the energy therein. Thus, the whole cyclic process is completed.

As the generator 5 functioning as an electric motor causes increase of the rotating speed of the compressor impeller 7, the power output from the turbine is increasingly large, and the driving power required to be output by the generator 5 is increasingly small, until the power output from the turbine exceeds the power required for the compressor. At this time, the function of the generator 5 is changed from an electric motor to a generator and starts to output electric energy.

As can be seen from the above working process, in the thermoelectric conversion device with the above structure, in addition to outputting electric energy, the generator 5 functions as an electric motor so as to drive the compressor to rotate at an initial stage of system startup, thereby converting the normal-temperature air 32 into the high-temperature and high-pressure airflow. As compared with the prior art, since there is no need for additionally providing start-up equipment to rotate the compressor, the thermoelectric conversion device according to the application has good startability, so that the thermoelectric conversion device can have simple and compact structure, relatively reduced contour dimension and smaller occupying space.

It should be noted that the specific mounting position of the generator 5 is not limited in the above specific embodiment. Any thermoelectric conversion device with the generator 5 provided with the lead 3 for inputting current and also functioning as start-up equipment is deemed to fall into the protection scope of the present application.

In addition, the orientation word "rear" as used herein refers to the flowing direction of the normal-temperature gas after entering through the compressor entrance, that is, the direction from left to right in FIG. 1. The orientation word "front" is contrary to the above direction, that is, the direction from right to left in FIG. 1. It should be appreciated that these orientation words are defined on the basis of the accompanying drawings, and the presence thereof should not affect the scope of protection of the present application.

It is possible to further define the mounting position of the generator 5 described above.

In another specific embodiment, as shown in FIG. 1, the above generator 5 can be arranged in an air inlet flowing passage 4 inside the compressor. By employing such a structure, when the unit is in normal operation, part of the normal-temperature air 32 flows through between cooling fins of the generator 5 and compulsorily cools the generator 5, so that the operating temperature of the generator 5 is maintained within reasonable range, thus ensuring the service time of the generator 5. As compared with the prior art, the present application can better solve the cooling problem while also saving electric energy consumption on cooling, with no need for additionally providing an electrically driven cooling fan.

Figure 3:
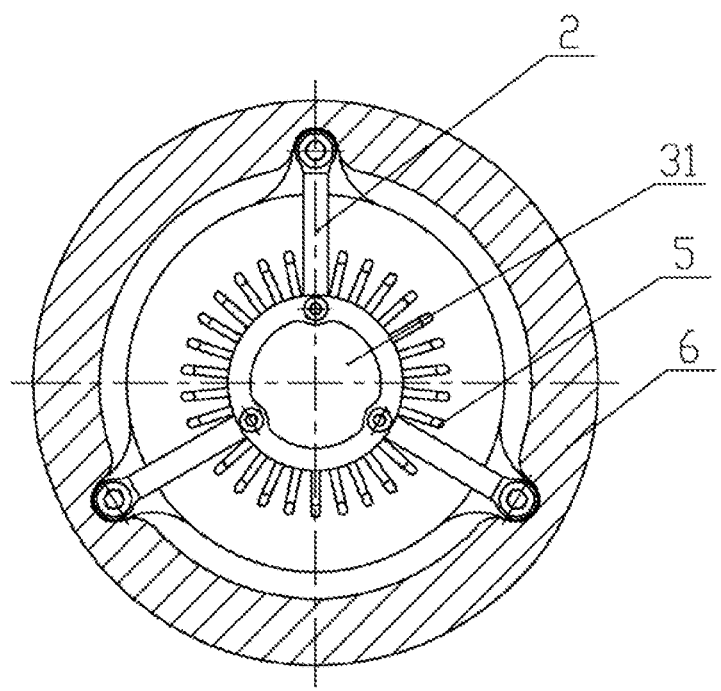
FIG. 3 is a sectional view taken along line A-A in FIG. 1.

In a specific solution, as shown in FIG. 3, it is a sectional view taken along line A-A in FIG. 1. A motor supporter 2 can be provided inside the air inlet pipe 6 of the compressor. An air deflector 31 can also be provided on the air inlet side of the motor supporter 2, and a bearing assembly 30 can be provided inside the air deflector 31. The bearing assembly 30 and the generator 5 both are mounted on the motor supporter 2. A lead 3 of the generator 5 sequentially passes through an internal passage of one leg of the motor supporter 2 and out of a lead hole in the air inlet pipe 6 so as to be connected to other components than the generator 5. Of course, the above generator and the lead thereof are not limited to the above mounting mode, and may also be in other specific structural forms.

Still further, the turbine impeller 18 can be fixedly connected to a rear end of the transmission shaft 28 through a fastening bolt 21. The compressor impeller 7 can be fixedly connected to a front end portion of the transmission shaft 28 through a tightening nut 29, and the rotating shaft of the generator 5 can also be connected to a most front end of the transmission shaft through a nut. Of course, the generator 5, the compressor impeller 7 and the turbine impeller 18 can also be fixedly connected to the transmission shaft 28 in other ways. An air filtering assembly 1 can also be provided at an inlet opening portion of the air inlet pipe 6 of the compressor, so as to preliminarily filter the normal-temperature air 32, thus preventing dust or impurities in the air from going into the compressor and ensuring the working stability and reliability of the thermoelectric device.

The diffusing pipe 27 of the compressor is an annular space formed between an end surface of a positioning boss 56 on the front flange 11 of the intermediate body 12 and a corresponding portion of a compressor volute 8. By employing the diffusing pipe 27 with this structural shape, it is possible to more quickly reduce the flowing speed, temperature and increase the pressure of the air going into the compressor, so as to form high-pressure air 10.

It is possible to further arrange the thermoelectric conversion device in other specific structural forms.

In another specific embodiment, a heat insulation plate 46 is provided between the rear flange 24 of the intermediate body 12 and the turbine volute 17. The rear flange 24 can be provided thereon with a positioning clamping ring 54 which fixes the heat insulation plate 46 onto the turbine volute 17. An annular nozzle 16 is formed between the heat insulation plate 46 and a vertical rear side wall of the turbine volute 17. Because the high-temperature airflow enters into the annular nozzle 16, and expands in the nozzle 16 so as to achieve pressure reduction, temperature reduction and speed increase, the heat insulation plate 46 provided between the intermediate body 12 and the turbine volute 17 is able to avoid the heat of the high-temperature air from diffusing outside of the volute and causing unnecessary heat loss, so that the heat of the high-temperature air is fully utilized and the conversion rate and working reliability of the thermoelectric conversion device are increased.

Of course, the specific structural form of the heat insulation plate 46 is not limited herein. For example, the heat insulation plate 46 can be provided thereon with means such as heat insulating groove, heat insulating slot and heat insulating coating, or a structural form such as multi-layer heat insulation can by employed. Any heat insulation plate 46 arranged between the rear flange 24 of the intermediate body 12 and the turbine volute 17 and functioning to insulate heat is deemed to fall into the protection scope of the present application.

Figure 4:
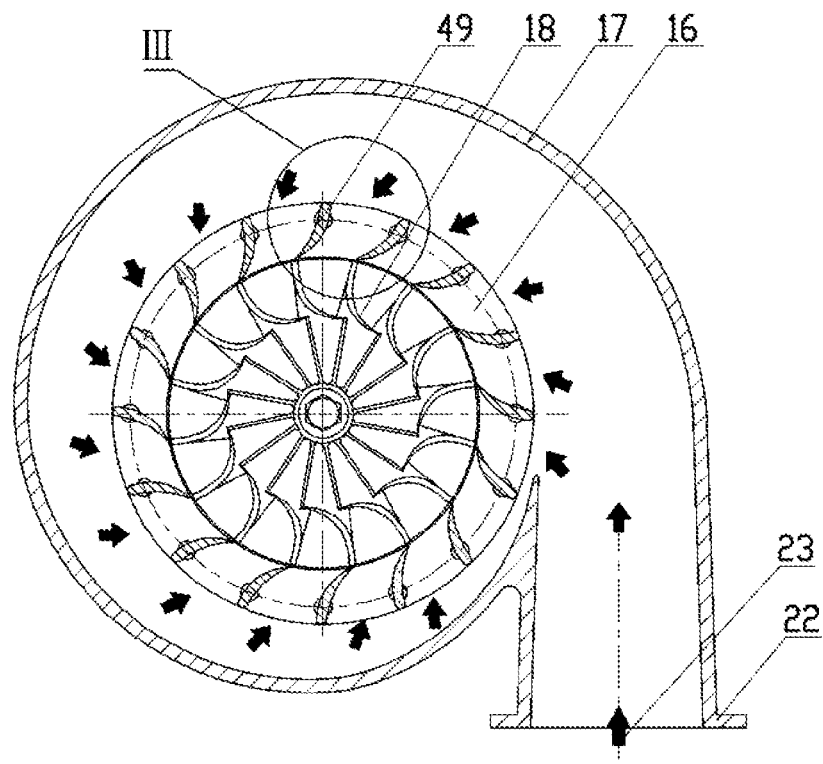
FIG. 4 is a sectional view taken along line B-B in FIG. 1.
Figure 5:
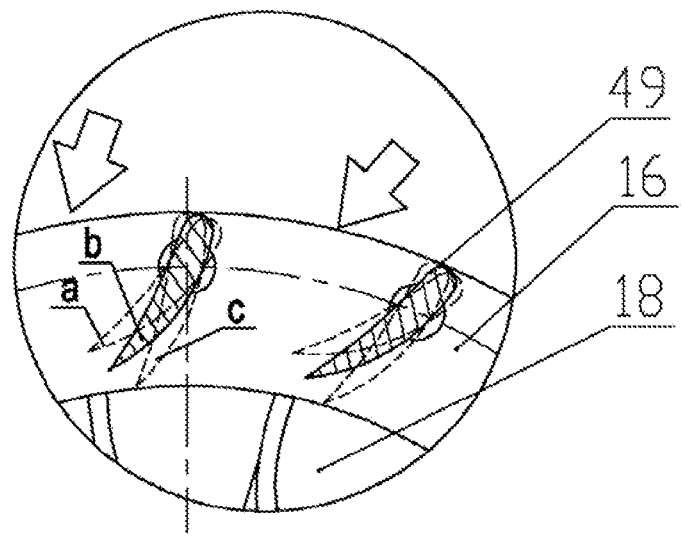
FIG. 5 is a partial enlarged view of part III in FIG. 4.

In a further solution, referring to FIGS. 4 and 5, FIG. 4 is a sectional view taken along line B-B in FIG. 1; and FIG. 5 is a partial enlarged view of part III in FIG. 4. At least one airflow guide vane 49 for adjusting the injection-expansion ratio of airflow within the nozzle 16 is provided in the nozzle 16. Specifically, the heat insulation plate 46 may be provided with a through hole oriented in fore-and-aft direction, and an outer end of the airflow guide vane 49 is pivotally connected in the through hole, so that an inner end of the airflow guide vane 49 swings as the outer end rotates in the through hole.

By employing this structural form, when the thermoelectric conversion device is in normal operation, the guide vane 49 is located at a position b. When the pressure and flow of the high-temperature air 23 going into the turbine air inlet 22 is lower than the design value, the outer end of the airflow guide vane 49 pivotally connected to the heat insulation plate 46 can be rotated to drive the inner end of the airflow guide vane 49 to swing to a position a, so as to reduce the outlet cross-sectional area of the nozzle 16 and increase the flowing velocity of the air when it goes into the turbine impeller 18. As a result, the rotating speed of the turbine is increased and the boost pressure and air supply amount for the compressor are increased correspondingly, thereby increasing the flowing speed and pressure of the air going into the turbine. When the pressure and flow of the high-temperature air going into the turbine air inlet 22 is higher than the design value, the airflow guide vane 49 can be rotated to a position c, so as to increase the outlet cross-sectional area of the nozzle 16 and reduce the flowing speed of the high-temperature air 23. As a result, the rotating speed of the turbine is reduced and the supply air pressure and supply air flow for the compressor are reduced, thereby reducing the flowing speed and pressure of the air going into the turbine, so as to avoid overspeed of the system.

As can be seen from the above adjusting process, the rotating speed of the turbine impeller 18 can be adjusted by mounting the airflow guide vane 49, so that the rotating speed of the system when it is operating is within the design range, thus avoiding excessive fluctuation of the rotating speed of the turbine impeller 18 due to larger fluctuation in solar radiation and so on. As compared with the prior art, the working stability and robustness of the thermoelectric conversion device are significantly improved, so that it has better anti-interference performance.

The thickness in the fore-and-aft direction and the length from the outer end to the inner end of the airflow guide vane 49 are not limited in the above specific embodiment. The thickness in the fore-and-aft direction of the airflow guide vane 49 can fully or partially occupy the space between the heat insulation plate 46 and the vertical side wall of the turbine volute 18. The length from the outer end to the inner end of the airflow guide vane 49 can be slightly larger, or smaller than the radial width of the annular nozzle 16. The user can make options according to the magnitude of shifting angle and the magnitude of target adjusting amount.

Of course, the airflow guide vane 49 is not limited to the above mode and can be in other modes. For example, the inner end of the airflow guide vane 49 may be connected fixedly and pivotally to the heat insulation plate 46, and the injection-expansion ratio of the airflow within the nozzle 16 may be adjusted through the outer end of the airflow guide vane 49. For another example, the airflow guide vane 49 can also be inserted into the heat insulation plate 46 in such a manner to be slidable in the fore-and-aft direction. When the fluctuation in rotating speed is relatively large, the airflow guide vane 49 is driven to slide in the fore-and-aft direction. The rotating speed of the turbine impeller 18 may be adjusted by changing the thickness of airflow guide vane 49 in the fore-and-aft direction. In addition, the airflow guide vane 49 adjusting the flow can also be in other specific structural forms.

It should be noted that the orientation word "outer" used herein refers to the direction along which the air diffuses outwards from the center of the turbine impeller 18 in the end surface of the volute, that is, the direction from bottom to top in FIG. 5. The orientation word "inner" is contrary to the above direction, that is, the direction from top to bottom in FIG. 5. The term "end surface" refers to the surface in the vertical direction in FIG. 1. It should be appreciated that these orientation words are established based on the accompanying drawings, and the presence thereof should not affect the scope of protection of the present application.

Figure 6:
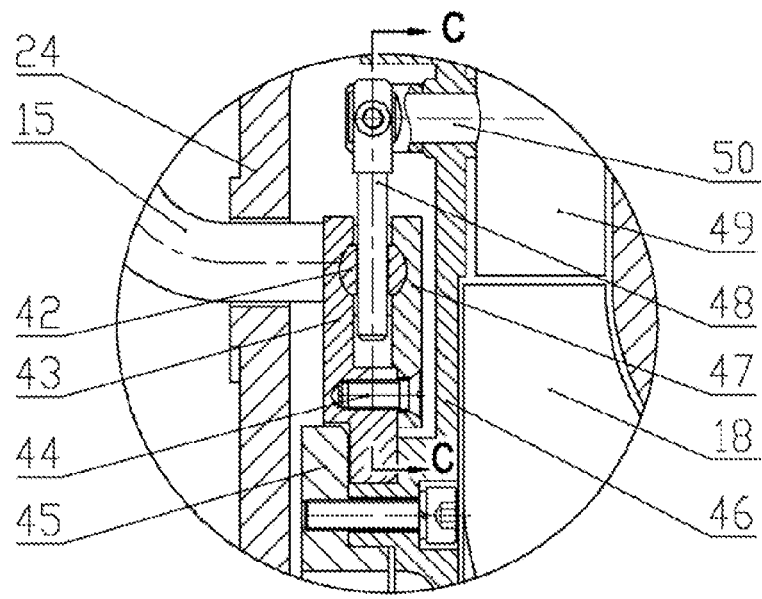
FIG. 6 is a partial enlarged view of part II in FIG. 1.
Figure 7:
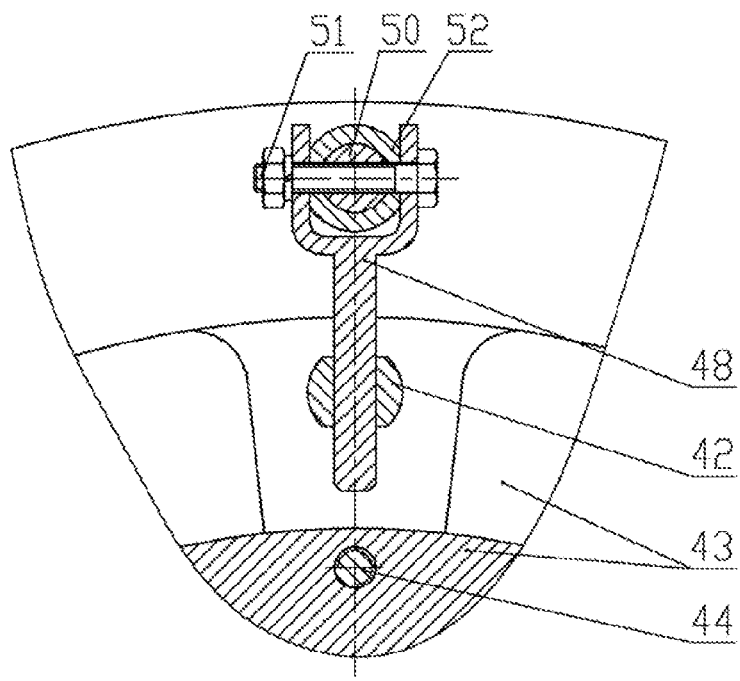
FIG. 7 is a sectional view taken along line C-C in FIG. 6.
Figure 8:
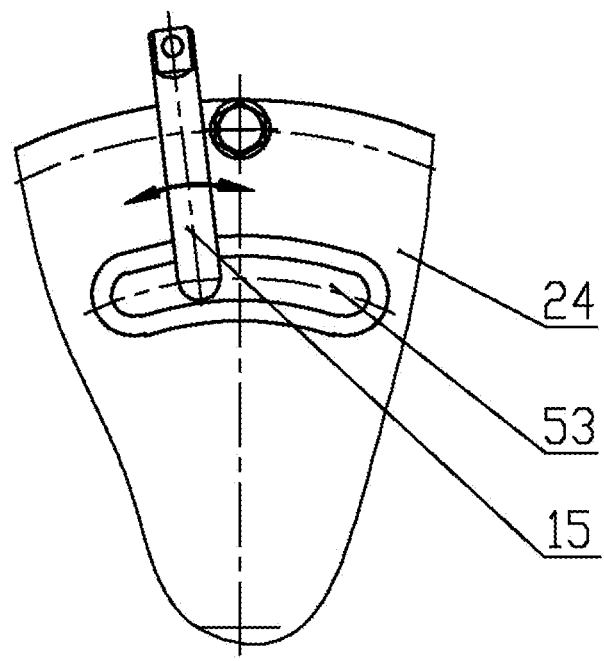
FIG. 8 is a view seeing from the direction F in FIG. 1.

Referring to FIGS. 6, 7 and 8, FIG. 6 is a partial enlarged view of part II in FIG. 1; FIG. 7 is a sectional view taken along line C-C in FIG. 6; and FIG. 8 is a view seeing from the direction F in FIG. 1.

In a more specific solution, as shown in FIGS. 6, 7 and 8, a rear side wall of the intermediate body 12 is provided with an arc-shaped hole 53, and a shift lever 15 slidable along the arc of the arc-shaped hole 53 is inserted into the arc-shaped hole 53. The shift lever 15 passes through a rear end of the intermediate body 12 to be connected to a slide ball 42 that rotates in an end surface along with the shift lever 15. A shift fork 48 is provided at the front side of the heat insulation plate 46. The outer end of the airflow guide vane 49 is fixedly connected between two fork-shaped portions of the shift fork 48, and a straight-bar portion of the shift fork 48 is slidably inserted into a through hole of the slide ball 42.

By employing this structural form, when the pressure and flow of the high-temperature air 23 going into the turbine air inlet 22 is higher or lower than the design value, the shift lever 15 is rotated so as to slide in the arc-shaped hole 53 and drive the slide ball at the rear end of the shift lever 15 to rotate accordingly. Because the fork-shaped portions of the shift fork 48 are fixedly connected to the airflow guide vane and the straight-bar portion of the shift fork 48 is slidably inserted into a through hole of the slide ball 42, the rotation of the slide ball 42 in the end surface can drive the fork-shaped portions of the shift fork 48 to rotate appropriately, thereby driving the outer end of the airflow guide vane 49 fixedly connected to the fork-shaped portions to rotate. As a result, the adjustment of the injection-expansion ratio of the airflow within the nozzle 16 is achieved.

Thus, as can be seen, by employing the above manipulating structure, when the angle of the airflow guide vane 49 is adjusted as desired, the operator merely shifts the shift lever 15, so that it slides in the arc-shaped hole 53, thereby achieving the angle adjustment of the airflow guide vane 49, which simplifies the operation of flow adjustment. When the fluctuation in solar radiation is relatively large, the adjusting process can be completed rapidly, thus having a good responsibility.

Of course, the mode of fixed connection between the fork-shaped portions at the outer end of the shift fork 48 and the outer end of the airflow guide vane 49 is not limited in the above specific embodiment, and the fork-shaped portions can be fixedly connected to a rotating shaft 50, inserted into a through hole of the heat insulation plate 46, of the airflow guide vane 49 via a pin assembly 51. A retaining sleeve 52 can also be provided between the through hole of the heat insulation plate 46 and the rotating shaft 50 of the airflow guide vane 49, and is also fixedly connected to the fork-shaped portions of the shift fork 48. The provision of the retaining sleeve 52 herein can have a certain protective action on the rotating shaft 50 of the airflow guide vane 49 and avoid the rotating shaft 50 from subjecting larger wear due to excessive rotation, which would otherwise cause hot air leakage and so on.

The specific structural form by which the shift lever 15 drives the slide ball 42 to rotate is not limited in the above specific embodiment. Specifically, a clamp structure can be fixedly connected to the rear end of the shift lever 15 and the slide ball 42 can be clamped in the clamp structure so that the slide ball 42 can be freely rotated but can not be moved in the inward-outward direction. More specifically, a major clamp piece 43 and a minor clamp piece 47 can be arranged at two sides of the slide ball 42, and the major clamp piece 43 and the minor clamp piece 47 are connected as one piece through a fastening assembly 44. A retaining ring 45 can also be provided at an inner end of the major clamp piece 43. The retaining ring 45 presses the clamp assembly against the front side of the heat insulation plate 46, so that the clamp structure can be rotated about the inner end thereof in the end surface.

In summary, the operation for adjusting the injection-expansion ratio within the nozzle 16 can be stated completely as follow: firstly, the shift lever 15 is manipulated so that it slides in the arc-shaped hole 53, thereby driving the outer end of the clamp structure to rotate about the inner end thereof and thus driving the slide ball 42 in the clamp assembly to rotate therewith; then, the straight-bar portion of the shift fork 48 is driven to slide in the slide ball 42, and the fork-shaped portions of the shift fork 48 drive the rotating shaft 50 of the airflow guide vane 49 to rotate, thereby achieving the position change of the airflow guide vane 49 so as to adjust the injection-expansion ratio within the nozzle 16; and thus, adjustment of the rotating speed of the turbine impeller 18 is achieved finally.

Thus, as can be seen, the above manipulating device, in which movement is transferred sequentially from the shift lever 15, the clamp structure, the slide ball 42, the shift fork 48 to the airflow guide vane 49, has the technical effects such as easy manipulation, convenient control and actuate adjustment. Of course, the manipulating device for the airflow guide vane 49 is not limited to the above specific structural form and can also be a variety of other manipulation modes.

A lubricating system and a cooling system may further be provided in the above thermoelectric conversion device.

Figure 9:
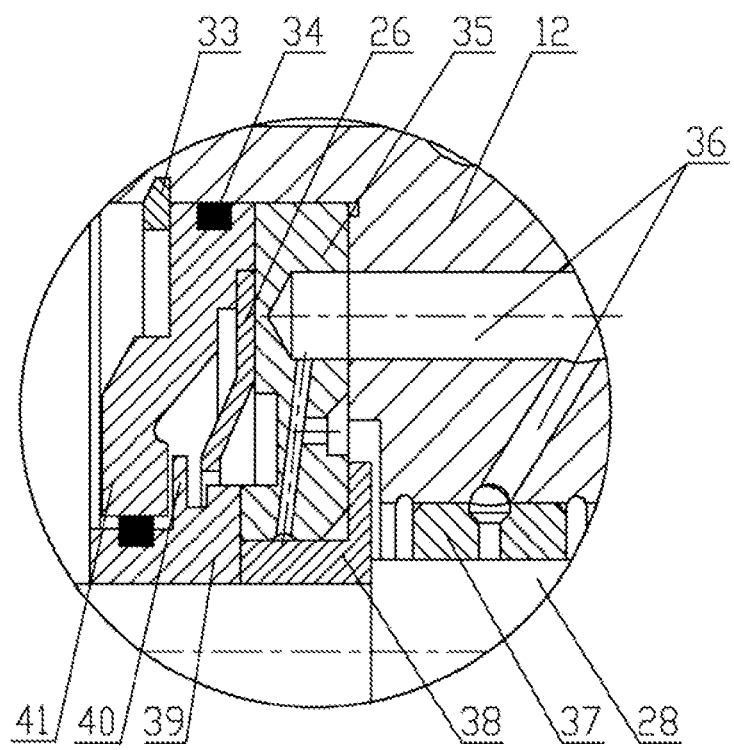
FIG. 9 is a partial enlarged view of part I in FIG. 1.
Figure 10:
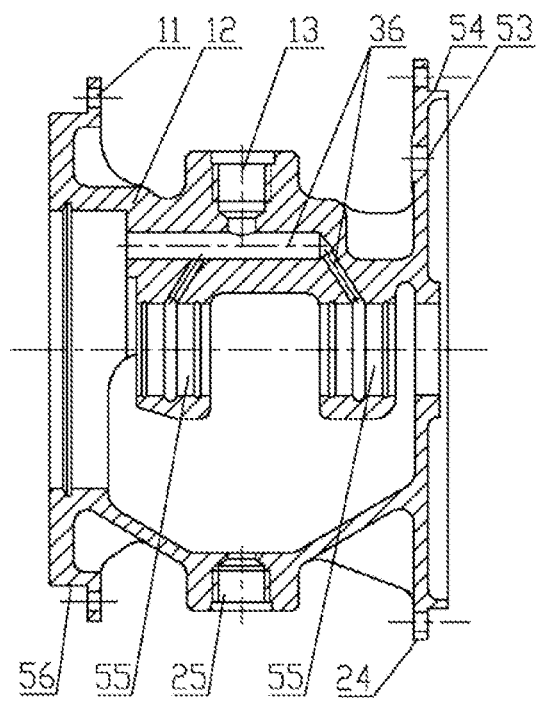
FIG. 10 is a longitudinal sectional schematic view of an intermediate body.

Referring to FIGS. 9 and 10 in conjunction with FIG. 1, FIG. 9 is a partial enlarged view of part I in FIG. 1; and FIG. 10 is a longitudinal sectional schematic view of the intermediate body 12.

In another specific embodiment, the intermediate body 12 is rotatably connected with the transmission shaft 28 through floating bearings 37. A thrust bearing 35 is provided in front of the floating bearings 37. An oil inlet hole 13 is provided at the top end of the intermediate body 12. Lubrication passages 36 leading to the two floating bearings 37 and the thrust bearing 35 are provided at the bottom end of the oil inlet hole 13. An oil outlet hole 25 is further provided at the bottom end of the intermediate body 12. A thrust ring 38 and a transition ring 39 are further provided in front of the thrust bearing 35. The thrust ring 38 cooperates with a shaft shoulder of the transmission shaft 28 and a thrust face of the thrust bearing 35, and the transition ring 39 cooperates with the compressor turbine 7 and the thrust face of the thrust bearing 35. An oil baffle plate 26 is provided on a lower end of a transition ring 39, and the lower end of the oil baffle plate 26 is arranged to be inclined towards the oil outlet hole 25.

By employing this structural form, lubricating oil 14 enters through an oil inlet hole 13 of the intermediate body 12 and is sent to friction pairs of the floating bearing 37 and the thrust bearing through the lubrication passages 36, so as to lubricate the friction surfaces while taking away heat generated by rotational friction. The lubricating oil 14 with elevated temperature flows out from an oil outlet hole 25 arranged at a lower portion of the intermediate body 12. In addition, most of the lubricating oil 14 that flows out from the front thrust bearing 35 will drip on the oil baffle plate 26, then slip along the oil baffle plate 26 to the oil outlet hole 25 and flow out.

Thus, as can be seen, by employing this structure, most of the lubricating oil 14 can be introduced into the intermediate body 12 for lubricating and cooling the bearings, and is discharged from the intermediate body 12 by the guiding effect of the oil baffle plate 26, thus producing the technical effects such as simple structure and easy manufacture and processing. Specifically, the thrust bearing 35 can be further provided with an oil hole aligned with the lubricating oil passage 36 to guide the lubricating oil 24, so as to achieve a better lubrication effect. Of course, the thrust bearing 35 and the lubrication passage 36 can also be communicated with each other in other specific ways.

In a further solution, a bearing cover 41 is provided at a front end of the transition ring 39 and in front of the thrust bearing 35. The bearing cover 41 is axially fixed to the thrust bearing 35 by a retaining ring 33. A sealing element 34 is provided at contacting areas. An oil throwing plate 40 projecting towards the outside of the transmission shaft 28 is further provided on the transition ring 39 between the sealing element 34 and the oil baffle plate 26.

By employing this structure, a part of the lubricating oil 14 after lubricating and cooling the bearings flows towards the transition ring 39 and is blocked by the oil throwing plate 40, and then is thrown to a side wall of the bearing cover 41 under the action of centrifugal force and flows down, thus forming dynamic seal. When the device is in operation, after a small amount of the lubricating oil 14 immerses the oil throwing plate 40, it will be sealed by the seal assembly 34 with static seal. In summary, by the oil baffle plate 26, the oil throwing plate 40 on the transition ring 39 and the seal assembly 34, it can be ensured that the lubricating oil 14 will not leak out from a side, close to the compressor, of the intermediate body 12, thus having a good sealing performance.

Similarly, in order to ensure that the lubricating oil 14 will not leak out from a side, close to the turbine, of the intermediate body 12, a projecting ring is provided at the rear side of the rear floating bearing 37 of the transmission shaft 28, and the sealing element 34 is provided at contacting areas between the projecting ring and a side wall of the intermediate body 12.

By employing this structure, the lubricating oil 14 that flows out from the floating bearing 37 on the turbine side will directly drip on the side wall of the intermediate body 12 firstly, and then flow towards the oil outlet hole 25. Even if a small amount of the lubricating oil 14 will infiltrate towards the turbine side along the transmission shaft 28, it can be thrown to the surrounding by the projecting ring on the transmission shaft 28, thus preventing the lubricating oil 14 from leaking outwards. When the system is not in operation, a small amount of the lubricating oil 14 infiltrates towards the turbine side along the transmission shaft 28 and will be sealed by the seal assembly 34 with static seal, thus ensuring that the lubricating oil 14 will not leak from the turbine side.

In another specific embodiment, as shown in FIG. 10, the intermediate body 12 has a cavity structure, and two bearing seat holes 55 arranged coaxially are provided in the middle of the intermediate body 12. A positioning ring 56 for positioning and connecting to the compressor is provided on the front flange 11 of the intermediate body 12, and a positioning and clamping ring 54 for clamping and positioning relative to the turbine is provided on the rear flange 24 of the intermediate body 12. The oil inlet hole 13 is provided in the top of the intermediate body 12 at a middle position. Three paths are formed from the oil inlet hole 13, two of which lead to the two bearing seat holes 55 respectively, and the other of which leads to a hole in which the thrust bearing 35 is mounted. The oil outlet hole 25 is provided in the bottom of the intermediate body 12 at a middle position. Of course, the oil inlet hole 13 and the oil outlet hole 25 are not limited to be provided at the middle position of the intermediate body. The intermediate body 12 is not limited to the above structure, and can also employ other structural forms.

The present application also provides a solar thermal power generation system, which includes a heat collector and further includes the above thermoelectric conversion device. The thermoelectric conversion device is connected to an output end of the heat collector.

Because the thermoelectric conversion device has the above technical effects, the solar thermal power generation system including the thermoelectric conversion device also has the corresponding technical effects, which will not be described in detailed herein.

The solar thermal power generation system and thermoelectric conversion device thereof according to the present application has been described in detail above. The principle and embodiments of the present application are described herein by using specific examples, and the description of the above embodiments is only used to help understanding the method and the core idea of the present application. It should be noted that, those skilled in the art may make various improvements and modifications to the present application without departing from the principle of the present application, and these improvements and modifications should also fall into the protection scopes of the claims of the present application.

The invention claimed is:

1. A thermoelectric conversion device for a solar thermal power generation system, comprising:
   a generator;
   a compressor;
   a turbine; and
   an intermediate body fixedly connected between the compressor and the turbine,
   wherein a transmission shaft is rotatably connected inside the intermediate body, the transmission shaft is fixedly connected to a rotating shaft of the generator, and a compressor impeller of the compressor and a turbine impeller of the turbine both are mounted on the transmission shaft; the generator is further connected to a lead for inputting current;
   wherein when the system is started, the generator functions as an electric motor; and when the system is in normal operation, the generator functions to produce electricity; and
   wherein the intermediate body is rotatably connected to the transmission shaft through a floating bearing, a thrust bearing is provided in front of the floating bearing; an oil inlet hole is provided at a top end of the intermediate body, lubrication passages leading to two of the floating bearing and the thrust bearing are provided at a bottom end of the oil inlet hole, an oil outlet hole is further provided at a bottom end of the intermediate body; an oil baffle plate is further provided at a lower end of a transition ring, the oil baffle plate is located in front of the thrust bearing and is arranged to be inclined towards the oil outlet hole.

2. The thermoelectric conversion device according to claim 1, wherein the generator is arranged in an air inlet flowing passage inside the compressor.

3. The thermoelectric conversion device according to claim 1, wherein a heat insulation plate is provided between a rear flange of the intermediate body and a turbine volute of the turbine, and an annular nozzle is formed between the heat insulation plate and a vertical rear side wall of the turbine volute.

4. The thermoelectric conversion device according to claim 3, wherein at least one airflow guide vane for adjusting the injection-expansion ratio of airflow within the nozzle is provided in the nozzle.

5. The thermoelectric conversion device according to claim 4, wherein the heat insulation plate is provided therein with a through hole oriented in a fore-and-aft direction, an outer end of the airflow guide vane is pivotally connected in the through hole, and an inner end of the airflow guide vane is configured to swing as the outer end rotates in the through hole.

6. The thermoelectric conversion device according to claim 5, wherein a rear side wall of the intermediate body is provided with an arc-shaped hole, a shift lever slidable along an arc of the arc-shaped hole is inserted into the arc-shaped hole, and the shift lever extends through a rear end of the intermediate body to be connected to a slide ball that rotates in an end surface along with the shift lever;
   a shift fork is provided in front of the heat insulation plate, the outer end of the airflow guide vane is fixedly connected between two fork-shaped portions of the shift fork, a straight-bar portion of the shift fork is slidably inserted into a through hole in the slide ball.

7. The thermoelectric conversion device according to claim 1, wherein a diffusing pipe of the compressor is an annular space formed between an end surface of a positioning boss on the front flange of the intermediate body and a corresponding portion of a compressor volute.

8. The thermoelectric conversion device according to claim 1, wherein a sealing element is provided at a contact area between a front end of the transition ring and a bearing cover of the thrust bearing, and an oil throwing plate that projects towards the outside of the transmission shaft is further provided on the transition ring between the sealing element and the oil baffle plate.

9. The thermoelectric conversion device according to claim 8, wherein a projecting ring is provided at a rear side of the rear floating bearing for the transmission shaft, the sealing element is provided at a contacting area between a rear end of the projecting ring and a side wall of the intermediate body.

10. A solar thermal power generation system, comprising a heat collector and the thermoelectric conversion device according to claim 1, wherein the compressor of the thermoelectric conversion device is located upstream of the heat collector, and the turbine of the thermoelectric conversion device is located downstream of the heat collector.

11. The solar thermal power generation system according to claim 10, wherein the generator is arranged in an air inlet flowing passage inside the compressor.

12. The solar thermal power generation system according to claim 10, wherein a heat insulation plate is provided between a rear flange of the intermediate body and a turbine volute of the turbine, and an annular nozzle is formed between the heat insulation plate and a vertical rear side wall of the turbine volute.

13. The solar thermal power generation system according to claim 12, wherein at least one airflow guide vane for adjusting the injection-expansion ratio of airflow within the nozzle is provided in the nozzle.

14. The solar thermal power generation system according to claim 13, wherein the heat insulation plate is provided therein with a through hole oriented in a fore-and-aft direction, an outer end of the airflow guide vane is pivotally connected in the through hole, and an inner end of the airflow guide vane is configured to swing as the outer end rotates in the through hole.

15. The solar thermal power generation system according to claim 14, wherein a rear side wall of the intermediate body is provided with an arc-shaped hole, a shift lever slidable along an arc of the arc-shaped hole is inserted into the arc-shaped hole, and the shift lever extends through a rear end of the intermediate body to be connected to a slide ball that rotates in an end surface along with the shift lever;

a shift fork is provided in front of the heat insulation plate, the outer end of the airflow guide vane is fixedly connected between two fork-shaped portions of the shift fork, a straight-bar portion of the shift fork is slidably inserted into a through hole in the slide ball.

16. The solar thermal power generation system according to claim 10, wherein a diffusing pipe of the compressor is an annular space formed between an end surface of a positioning boss on the front flange of the intermediate body and a corresponding portion of a compressor volute.

17. The solar thermal power generation system according to claim 10, wherein a sealing element is provided at a contact area between a front end of the transition ring and a bearing cover of the thrust bearing, and an oil throwing plate that projects towards the outside of the transmission shaft is further provided on the transition ring between the sealing element and the oil baffle plate.

18. The solar thermal power generation system according to claim 17, wherein a projecting ring is provided at a rear side of the rear floating bearing for the transmission shaft, the sealing element is provided at a contacting area between a rear end of the projecting ring and a side wall of the intermediate body.

\* \* \* \* \*